April 5, 1966          J. D. FROST          3,244,458
INFLATABLE ENDLESS BELT AND SUPPORT THEREFOR
Filed Jan. 21, 1964          3 Sheets-Sheet 1
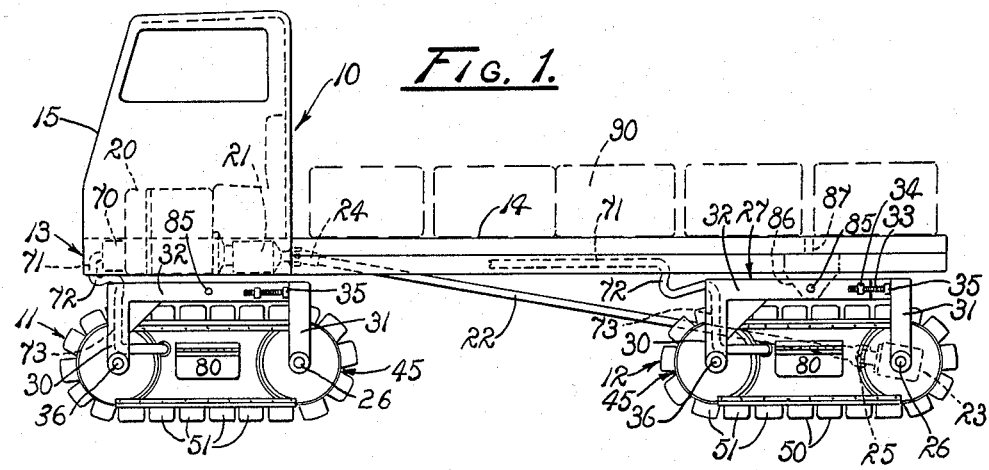
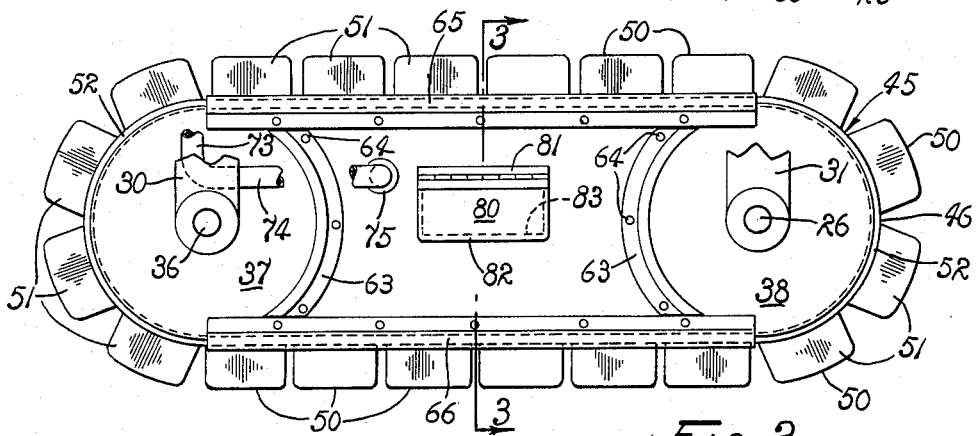
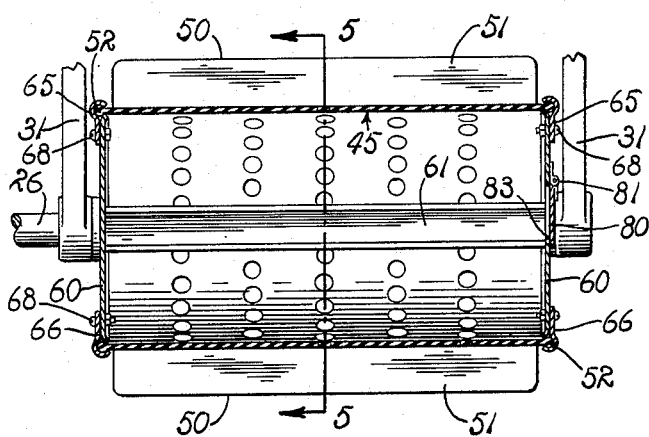
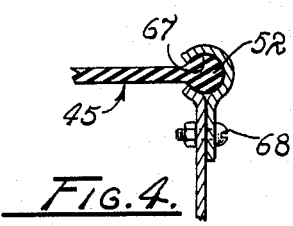
JAMES DAHLE FROST
INVENTOR
Huebner & Worrel
ATTORNEYS April 5, 1966  J. D. FROST  3,244,458
INFLATABLE ENDLESS BELT AND SUPPORT THEREFOR
Filed Jan. 21, 1964  3 Sheets-Sheet 2

JAMES DAHLE FROST
INVENTOR

Huebner & Worrel
ATTORNEYS

April 5, 1966  J. D. FROST  3,244,458
INFLATABLE ENDLESS BELT AND SUPPORT THEREFOR
Filed Jan. 21, 1964  3 Sheets-Sheet 3

JAMES DAHLE FROST
INVENTOR

Huebner & Worrel
ATTORNEYS

United States Patent Office 3,244,458
Patented Apr. 5, 1966

3,244,458
INFLATABLE ENDLESS BELT AND SUPPORT THEREFOR
James Dahle Frost, P.O. Box 775, Porterville, Calif.
Filed Jan. 21, 1964, Ser. No. 339,139
15 Claims. (Cl. 305—34)

The present invention relates to an endless belt and support therefor adapted to provide a resilient load engaging surface which is motivated in a circuitous path of travel.

In certain operating environments, an endless belt can readily utilize a resiliently cushioned, shock absorbing, load engaging surface. One example of such an operating environment is that of a belt conveyor utilized to transport fragile articles, such as eggs, and the like, or produce with is easily bruised and damaged. Prior to the present invention, belts of flexible material were employed in an attempt to provide a satisfactory structure. However, such belts are incapable of absorbing the kinetic energy of articles dropped onto the load engaging surface of the belt. When a resilient material is used for the belt, rebound of the article results. Consequently, previous flexible belt conveyors were found unsatisfactory in certain respects when utilized in the transport of fragile, easily damaged articles.

Another example of an operating environment in which an endless belt providing a resilient, shock absorbing, load engaging surface is highly desirable is that of a traction mechanism for a vehicle. Many vehicles employ an articulated track, or chain, as a traction mechanism, such as those commonly employed in track-type or crawler tractors, cranes, power shovels, and the like. Conventional articulated tracks of this type normally employ a track shoe provided with an earth engaging element, such as an upstanding lug or grouser. Consequently, such track mechanisms normally rely upon the shear-strength of the earth, or other material being traversed, to provide sufficient reaction forces necessary to propel the vehicle incident to powered motivation of the track mechanism. Since such track mechanisms are normally fabricated of steel affording a relatively smooth surface other than the grouser, frictionally engagement with the earth surface is not relied upon to provide the necessary reaction force. Accordingly, when operating in an environment affording a slippery surface, such as wet clay and the like, many tracked vehicles are unable reliably to propel themselves. Since wheeled vehicles normally afford a smaller area of load engaging surface than tracked vehicles, such wheeled vehicles are less suited to negotiate such slippery surfaces.

In addition to inability to cope with slippery surface conditions, many vehicles are incapable of providing a cushioned or resilient traction mechanism adapted to absorb shock forces resulting from encountering bumps and other surface irregularities.

Therefore, it is an object of the present invention to provide an endless belt and support therefor affording a cushioned load engaging surface.

Another object is to provide an endless belt and support therefor equally well suited to serve as a vehicle propulsion mechanism or a cushioned belt conveyor.

Another object is to provide an inflatable endless belt and support therefor adapted for selective pressurization to accommodate a variety of operating environments.

A further object is to provide an endless belt and support therefor which effectively absorbs impact forces of articles contacting the load engaging surface afforded by the belt.

A still further object is to provide in an endless belt and support therefor a supply system for a pressurizing fluid and a cooperating exhaust valve to permit controlled escape of the pressure fluid at a rate proportioned to the supply flow rate.

These, together with other objects, will become more fully apparent upon reference to the following description and accompanying drawings.

In the drawings:

FIG. 1 is a view in side elevation of a self-propelled vehicle provided with traction mechanism incorporating an endless belt and support therefor embodying the principles of the present invention.

FIG. 2 is an enlarged fragmentary view in side elevation of one of the endless belts and supports of FIG. 1.

FIG. 3 is a fragmentary view in vertical, transverse section taken on line 3—3 of FIG. 2.

FIG. 4 is an enlarged fragmentary view of the structure shown in FIG. 3.

Figure 5:
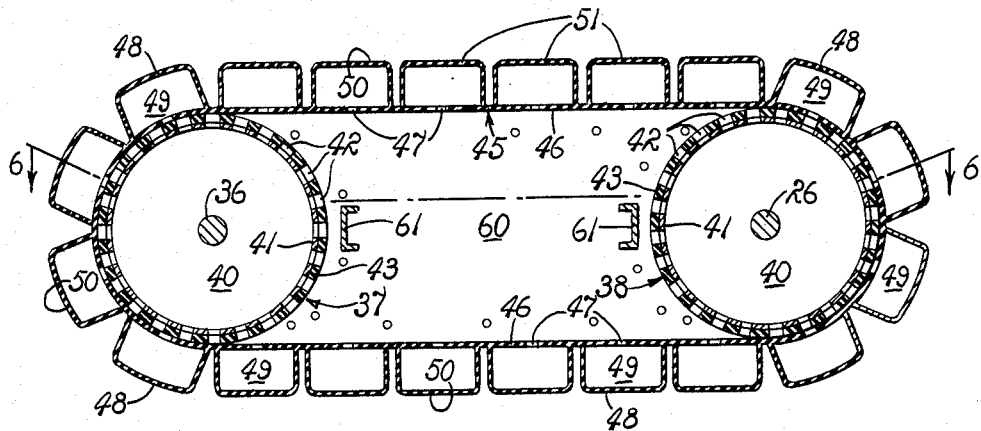
FIG. 5 is a view in longitudinal, vertical section taken on line 5—5 of FIG. 3.

Referring in greater particularity to FIG. 1, a vehicle generally indicated at 10 is provided with a pair of laterally opposed front endless belt and support mechanisms 11 and a substantially identical pair of rear endless belt and support mechanisms 12. The vehicle 10 provides a chassis 13 including a load platform 14 and operator's cab 15.

The vehicle is provide with an engine 20 as a prime mover having conventional speed and operating controls, not shown. The engine is connected in driving relation to a transmission 21 affording selective speed reduction. A drive shaft 22 interconnects the transmission 21 and a differential power transmission 23 by respective front and rear universal joints 24 and 25. Each of the rear belt and support mechanisms 12 is provided with a drive axle 26 connected in driven relationship to the differential 23 and supported for rotation in respective support brackets 27. Other forms of power dividing mechanisms will readily occur to those skilled in the art so as to provide substantially independent powered rotation to each of the respective drive axles 26 of both of the rear belt and support mechanisms.

The front endless belt and support mechanisms are each provided with a drive axle 26 and connected in driven relationship to the engine 20 by any suitable power transmission means, not shown for purposes of clarity.

The front and rear endless belt and support mechanisms 11 and 12 are substantially identical in construction. Accordingly, a description of one will suffice, like reference numerals being used to designate corresponding elements.

As shown more clearly in FIGS. 1 through 3, the endless belt and support mechanism 12 includes a pair of laterally opposed front arms 30 and a pair of laterally opposed rear arms 31. Each pair of arms 30 and 31 are interconnected by a telescopic strut element 32 provided with an extensible turnbuckle screw 33 screw-threadably connected to front and rear anchorages 34 and 35. It will be observed that appropriate rotation of the turnbuckle screw 33 will effect selective longitudinal spacing of the pairs of arms 30 and 31 and consequent selective tensioning of the endless belt subsequently to be described.

The drive axle 26 is rotatably mounted in the rear pair of arms 31 and a front idler axle 36 is mounted for rotation by suitable bearings, not shown, in the front pair of arms 30. A front cylindrical element 37 is rigidly secured to the idler axle 36 and a substantially identical rear cylindrical element 38 is similarly secured to the drive axle 26.

Each of the front and rear cylindrical elements 37 and 38 includes a pair of laterally opposed imperforate end walls 40 which support a perforate peripheral wall 41. The peripheral wall is provided with a plurality of fluid inlet and outlet apertures 42 distributed in a random pattern about the wall 41. An annular cover 43 circumscribes the wall 41 and is provided with a plurality of apertures radially and axially aligned with the apertures 42 of the peripheral wall 41. The annular cover preferably is constructed of a resilient material, such as rubber or other elastomeric substance. The peripheral wall 41 is provided with axially opposed annular grooves 44 immediately adjacent to the end walls 40.

Figure 6:
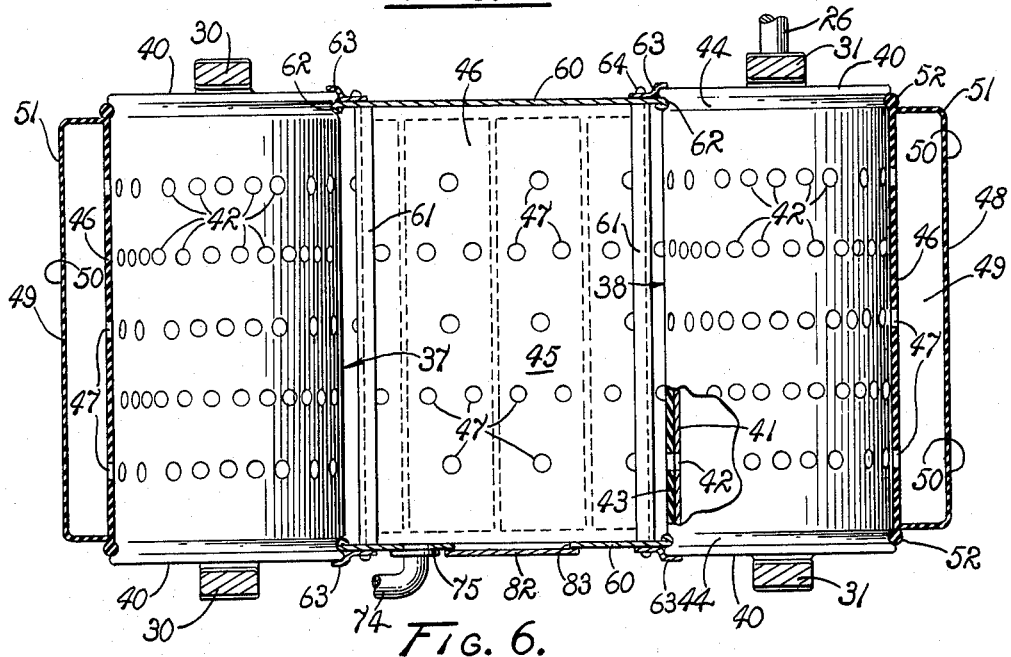
FIG. 6 is a view in horizontal, longitudinal section taken on line 6—6 of FIG. 5.

A continuous belt 45 is trained about the front and rear cylindrical elements 37 and 38 for circuitous movement therearound. The belt 45 provides a perforate inner wall 46 provided with a purality of apertures 47 dispersed in a random pattern so as to insure constant communication between the apertures 42 of the cylinders 37 and 38 and the apertures 47 of the belt during circuitous movement thereof. The belt also provides an outer wall 48 outwardly spaced from the wall 46 so as to define a fluid receiving chamber 49 as can be seen more clearly in FIGS. 5 and 6. The outer wall is fabricated of flexible material having at least limited resiliency, such as polyethylene sheet material or other thermoplastic or elastomeric material having similar physical characteristics. The outer wall 48 also affords a load engaging surface 50, which is adapted to contact a surface of support, such as the ground when the vehicle 10 is propelled by the engine 20.

In the form of the invention illustrated in FIGS. 1 through 6, the outer wall 48 is integrally joined to the inner wall at selected circumferential intervals so as to form a plurality of cushions 51, each affording individual compartments of the chamber 49. The particular configuration of the belt 45 when provided with cushions 51 enhances motivation of the belt in the circuitous path of travel about the cylinders 37 and 38, and simulates the movement of conventional articulated track chains employed in crawler or track-type tractors and similar vehicles. It will also be observed that the apertures 47 in the inner wall 46 are so dispersed to provide communication with each of the compartments of each of the chambers 49 afforded by the several cushions 51.

The belt 45 is also provided with laterally opposed marginal beads 52 adapted for individual reception in a respective one of the annular grooves 44. This construction insures alignment of the belt with the idlers 37 and 38, and also provides additional structural rigidity so as to maintain the load engaging surface 51 in a desired path of movement by selective tensioning of the belt 45 through appropriate adjustment of the extensible turnbuckle screw 33.

A pair of laterally opposed side plates 60, each having respective marginal edges disposed in contiguous relation to the belt 45 and the cylinders 37 and 38, are maintained in position by longitudinally spaced laterally extending tie bars 61. Each of the side plates 60 is provided with arcuate edges 62 adapted to be received in the respective grooves 44 of the cylinders 37 and 38. To preclude entrance of foreign material, each side plate is provided with front and rear arcuate sealing flanges 63 secured by a plurality of rivets 64. For similar reasons, upper and lower seal plates 65 and 66 are each provided with a transversely arcuately formed, longitudinally extended recess 67 to receive the bead 52 of the belt and is held in substantially sealing relation thereto by suitable retaining bolts 68.

A blower 70 is mounted in the chassis 13 and connected in driven relation to the engine 20 to provide a source of supply of pressure fluid, which in the form of the invention illustrated is air. A conduit 71 is mounted in the chassis and extends from the blower 70 to provide fluid communication with a flexible hose 72 connected to the bracket 27. The bracket 27 is provided with an internal conduit 73 in communication with a pipe 74 secured to one of the side plates by a mounting flange 75. Accordingly, the pump 70 is in fluid communication with the chamber 49 of the belt 45 through conduit 71, flexible hose 72, conduit 73, pipe 74, and the chamber formed by the enclosing side plates 60, the longitudinally spaced cylinders 37 and 38 and the belt 45 trained therearound.

At least one of the side plates 60 is provided with an exhaust valve 80 pivotally mounted thereon by a hinge 81 and provided with a biasing weight 82 so as to be urged toward a position substantially closing an exhaust opening 83. Accordingly, the valve in conjunction with the biasing weight 82 maintains a predetermined pressure within the chamber 49 and permits a controlled exhaust of the air at a rate proportioned to the inlet flow rate established by the pump 70.

Each of the front and rear endless belt and support mechanisms 11 and 12 are secured to chassis 13 by a transversely extended pivot shaft 85 so as to permit relative pivotal movement about respective horizontal axes. At least one of the mechanisms, such as the rear mechanism 12 is connected to the chassis by means of a bracket 86 secured to a pintle 87 affording relative movement with the chassis about a vertical axis. Accordingly, the vehicle is adapted for turning maneuvers as well as accommodating rough terrain encountered during motivation.

As illustrated in FIG. 1, the longitudinally extended load platform 14 affords a surface of support for a load in the form of boxes 90.

*Operation*

The operation of the described embodiment of the subject invention is believed to be readily apparent and is briefly summarized at this point. With the engine 20 in operation to effect driving of the pump 70, air at a predetermined inlet flow rate is admitted to the respective chamber 49 of each of the belts 45 through the admission system constituted by the conduit 71, hose 72, conduit 73, pipe 74, and the chamber formed by the side plates 60 in conjunction with the cylinders 37, 38 and the belt 45. Upon a predetermined pressure being reached within the chamber 49, continued operation of the pump 70 effects an opening of the valve 80 to permit controlled escape of the air at a rate proportioned to the inlet flow rate. The total mass of the valve 80, including the bias weight 82, is selected so as to effect the desired proportioned exhaust rate. Consequently, the individual cushions 51 affords a resilient, shock absorbing support for the load engaging surface 50.

The belt 45 is maintained under the desired tension by appropriate rotation of the turnbuckle screw 33 which effects a longitudinal spacing of the axles 26 and 36. By tensioning the belt 45 in accordance with the anticipated load to be encountered by the engaging surface 50, substantially uniform, intimate contact with a surface of support is made by the load engaging surface 50.

In the form of the invention illustrated in FIG. 1, the surface of support is the earth surface as the vehicle 10 is propelled by the engine 20, through the power train constituted by the transmission 21, drive shaft 22, and differential 23. By reason of the uniform inflation of the individual cushions 51 and the resilient shock absorbing characteristics thereof, each unit of area of the load engaging surface 50 is in intimate contact with the surface of the earth and bears its proportionate share of the total load including the weight of the vehicle and the boxes 90. Consequently, each unit of area of the load engaging surface 50 is thereby enabled to engage the surface of the earth in frictional driving relationship so as to permit self-propelling of the vehicle even while negotiating slippery surfaces, such as wet clay and the like.

In addition to enhancing the tractive characteristics of the vehicle, the belt and support mechanisms 11 and 12 afford resilient riding characteristics, even though surface irregularities and obstructions are encountered during movement. For example, if a number of large stones or other similar rough terrain is being negotiated, the individual cushions 51 are permitted to conform to such surface irregularities. In addition, the impact force incident to encountering such irregularities is absorbed through the controlled escape of the pressurizing air through the exhaust opening 83 under the influence of valve 80 and bias weight 82. As soon as such surface irregularities have been successfully traversed, the pump 70 in cooperation with the exhaust valve 80 effects a replenishing of the pressurizing air within chamber 49 so as to maintain the individual cushions 51 in an inflated conditon at the aforementioned predetermined pressure. Consequently, localized and concentrated impact forces are avoided so as to prevent damage to the outer wall 48 of the belt 45, while shock forces are absorbed. This interaction of the pump 70 in conjunction with exhaust valve 80 and the physical characteristics of outer wall 48 also provides maximum frictional contact between the earth surface and the load engaging surface 50.

Second form

Figures 7, 8, 9:
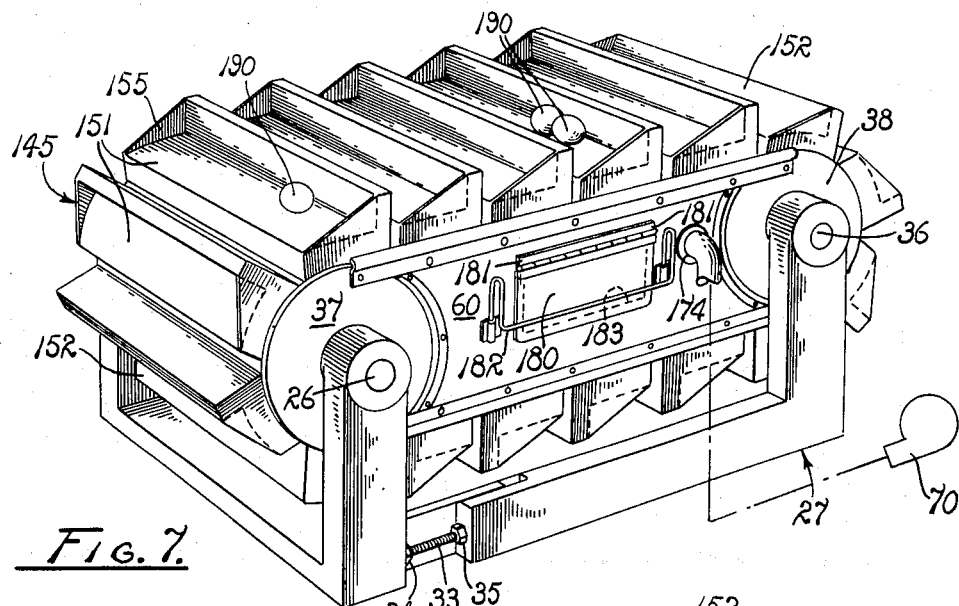
FIG. 7 is a perspective view of a second form of an endless belt and support therefor embodying the principles of the present invention.
FIG. 8 is an enlarged fragmentary view in longitudinal vertical section taken on a plane indicated by the line 8—8 in FIG. 7.
FIG. 9 is an enlarged fragmentary view of a portion of the belt shown in FIG. 7.

A second form of the invention is shown in FIGS. 7, 8 and 9 and is substantially identical in many respects to the first form illustrated in FIGS. 1 through 6. Accordingly, the same reference numerals have been employed to identify corresponding elements, as for example the drive axle 26 and the support axle 36. The second form is shown in FIG. 7 in a position substantially inverted from that illustrated in FIGS. 1 and 2, so that the drive axle 26 is at the left end of the mechanism. Spaced cylinders 37 and 38 secured respectively to the axles 26 and 36 support a continuous belt 145 trained thereabout. The belt 145 includes an inner wall 146 having a plurality of apertures 147 serving as inlet and outlet ports for the pressurizing air. Air is supplied from the pump 70 through inlet pipe 174 secured to one of the side plates 60. The belt 145 also provides an outer wall 148 which in conjunction with the inner wall 146 defines a chamber 149 as illustrated in FIG. 8. As in the first form of the invention, the outer wall 148 of the belt is fabricated of a flexible material, such as polyethylene or like elastomer, and is integrally joined to the inner wall 146 at selected spaced intervals so as to form a plurality of circumferentially spaced cushions 151 each affording a load engaging surface 150.

As illustrated in FIG. 7, the belt is disposed in a position and intended for use as a conveyor of articles to be deposited upon the load engaging surface 150. Consequently, motivation of the load engaging surface in a circuitous path of travel about the cylinders 37 and 38 will carry objects resting on the upper run of the conveyor, as viewed in FIG. 7, in a direction from right to left. Accordingly, each of the cushions 151 is provided with relative leading, or forward edges, and trailing, or rearward, edges, relative to the direction of movement which is counterclockwise in FIG. 7.

Each of the cushions 151 is provided with a respective upstanding lug 152 adjacent to the rearward end of the cushion. Internal reinforcing walls 153 interconnect the inner and outer walls 146 and 148 to provide structural rigidity and maintenance of the desired configuration while the belt is inflated during operation. The internal walls 153 are perforated as at 154 to establish fluid communication with the apertures 147 and insure uniform inflation of the individual cushions 151 and their respective lugs 152. Each of the cushions is also provided with laterally opposed marginal gussets 155 extended between the load engaging surface 150 and the upstanding lug 152 and thereby serve as reinforcing members as well as an articulated side rail for the conveyor.

As in the first form of the invention, a source of air pressure, such as the pump 70 is established in fluid communication with the chamber 149 by the inlet conduit 174 secured to the side plate 60. Accordingly, air is supplied to the chamber 149 at a predetermined inlet flow rate.

An exhaust valve 180 pivotally connected to the side plate 60 by a hinge 181 is biased by a spring 182 toward a closed position relative to an exhaust opening 183 provided in the side plate. This permits a controlled escape of air from the chamber 149 at a rate proportioned to the inlet flow rate so that a predetermined pressure is maintained within the chamber.

As in the first form, the belt 145 is selectively tensioned by the turnbuckle screw 33 of the support bracket 27. Inflation of the belt by admission of air to the chamber 149 and selective tensioning of the belt permits motivation through drive axle 26. Consequently, the load engaging surface 150 afforded by the individual cushions 151 is propelled in a circuitous path about the cylindrical elements 37 and 38. Objects, such as eggs indicated at 190 are deposited upon the load engaging surfaces 150 of the belt 145 and received in a cushioned manner due to the flexibility of outer wall 148 in conjunction with ability of the pressurization system to absorb the impact forces possessed by such articles contacting the conveyor. The kinetic energy of such an article when striking the surface 150 is absorbed by exhausting a required quantity of air through the opening 183 so as to maintain the desired pressure within the chamber 149. Upon such kinetic energy being absorbed, the source of air supply replenishes the air within chamber 149 through the inlet 174, and the outer wall 148 then returns to its normal inflated and unstressed condition, except those stresses incident to inflation and tensioning by the turnbuckle screw 33.

Accordingly, the present invention provides an endless belt and support therefor which affords a load engaging surface equally well-suited for use as a belt-type conveyor or a traction unit in a self-propelled vehicle. When employed in either type of mechanism, both forms of the invention are capable of absorbing shock forces and accommodating surface irregularities of any object encountered by the load engaging surface, whether such object is a portion of the surface of support or an object impacting upon the load engaging surface.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An endless belt and support therefor comprising a pair of spaced elements affording respective axes of rotation; means individually rotatably mounting said elements with said axes in substantially parallel aligment; an endless belt trained about said elements for circuitous movement therearound, the belt having spaced opposed inner and outer walls and predetermined upper and lower runs; a pair of spaced side plates interconnecting the upper and lower runs of the belt and said elements and therewith defining a chamber; means adapted to supply a pressure fluid to said chamber at a predetermined inlet flow rate, said chamber having an exhaust valve opening permitting continuous escape of said pressure fluid at a rate proportioned to said inlet flow rate so that fluid at a positive pressure is maintained within said chamber and excessive pressures dissipated by exhaust through the opening; and power means drivingly connected to one of said spaced elements to rotate the same and motivate the belt in a circuitous path about said elements.

2. The endless belt and support of claim 1 wherein said chamber is divided into an inner portion disposed between the upper and lower runs and between the plates, and a plurality of substantially uniformly circumferentially spaced cushions formed by said outer and inner walls, said cushions defining separate compartments in said chamber, each of said compartments having a restricted port in continuous communication with the inner portion of said chamber through which fluid is free to pass.

3. An endless belt and support therefor comprising a pair of spaced elements affording respective axes of rotation; means individually rotatably mounting said elements with said axes in substantially parallel alignment; an endless belt trained about said elements for circuitous movement therearound, the belt having spaced opposed inner and outer walls defining a pressure fluid receiving chamber and being adapted to confine a pressure fluid within said chamber, the belt also providing a load engaging surface; means adapted to supply a pressure fluid to said chamber at a predetermined inlet flow rate; valve means in communication with said chamber and affording an exhaust opening permitting controlled escape of said pressure fluid at a rate proportioned to said inlet flow rate so that fluid at a predetermined pressure is maintained within said chamber; and power means drivingly connected to one of said spaced elements to rotate the same and motivate the load engaging surface in a circuitous path about said elements, said valve means including a closure plate provided with an exhaust opening and a valve closure hingedly connected to said plate, said valve cover being provided with biasing means urging the cover toward a closed position relative to said opening.

4. An endless belt and support therefor comprising a pair of spaced elements affording respective axes of rotation; means individually rotatably mounting said elements with said axes in substantially parallel alignment; an endless belt trained about said elements for circuitous movement therearound, the belt having spaced opposed inner and outer walls defining a pressure fluid receiving chamber and being adapted to confine a pressure fluid within said chamber, the belt also providing a load engaging surface; means adapted to supply a pressure fluid to said chamber at a predetermined inlet flow rate; valve means in communication with said chamber and affording an exhaust opening premitting controlled escape of said pressure fluid at a rate proportioned to said inlet flow rate so that fluid at a predetermined pressure is maintained within said chamber; and power means drivingly connected to one of said spaced elements to rotate the same and motivate the load engaging surface in a circuitous path about said elements, wherein said belt is motivated in a predetermined direction of movement about said circuitous path so that said cushions have respective forward and rearward edges relative to said direction of movement, and wherein said cushions are provided with individual upstanding lugs adjacent to said rearward edge.

5. The endless belt and support of claim 4 wherein each of said cushions is provided with laterally opposed marginal reinforcing gusset members interconnecting the belt and respective upstanding lugs.

6. The endless belt and support of claim 4 wherein each of said cushions is provided with internal walls extended between said inner and outer walls to maintain said upstanding lug in a predetermined position relative to said load engaging surface.

7. An endless belt and support therefor affording a load engaging surface adapted to be motivated in a circuitous path of travel and comprising a pair of elongated cylinders having imperforate end walls and respective perforate peripheral walls, at least one of said cylinders being adapted as a drive cylinder and provided with an annular perforate covering circumscribing said peripheral wall, said covering being formed of an elastomeric material; spaced pairs of mounting arms individually rotatably supporting said cylinders; a telescopic strut interconnecting said pairs of mounting arms and including extensible means selectively to space said cylinders; an endless belt trained about said cylinders for circuitous movement therearound, the belt having an inner wall in engagement with the cylinders and an outer wall disposed in spaced relation to the inner wall at regular intervals to define a plurality of circumferentially spaced cushions, each affording an internal pneumatic chamber, the outer wall being fabricated of a flexible material and providing a load engaging surface for each of said cushions, said inner wall being provided with a plurality of apertures as air inlet and exhaust openings in communication with the chamber of each cushion; a pair of laterally opposed side plates having peripheral edges disposed in substantially sealing relation with said cylinders and said belt thereby defining an internal inlet chamber in communication with the individual chambers of said cushions and the apertures in said cylinders; a blower including an air inlet conduit in communication with the internal chamber formed by said side plates; at least one of said side plates being provided with an exhaust opening therein; and a valve cover hingedly mounted on said one side plate in closing relation to said exhaust opening, said valve cover being biased toward a closed position permitting controlled escape of the air from said chambers at a rate proportioned to said inlet flow rate so that a predetermined air pressure is maintained within the individual chambers of said cushions.

8. An endless belt and support therefor comprising a pair of elongated cylinders affording respective axes of rotation, a support bracket having two pairs of laterally opposed arms individually rotatably supporting said cylinders with said axes in spaced, substantially parallel alignment; said cylinders having respective peripheral walls provided with a plurality of apertures therein disposed in a random pattern; an annular covering of elastomeric material circumscribing each of said cylinders and provided with a plurality of apertures in matching relation to the apertures of the respective cylinder; an endless belt trained about said cylinders for circuitous movement therearound, the belt having spaced opposed inner and outer walls defining a pneumatic chamber therebetween, the outer wall being integrally joined to said inner wall at substantially uniform circumferential intervals so as to provide an external configuration of substantially uniform, circumferentially spaced cushions, said outer wall being fabricated of a flexible material and affording an external load engaging surface; drive means operatively connected to one of said cylinders to rotate the same and propel the belt in said circuitous movement in a predetermined direction; each of said cushions having a respective forward and rearward edge relative to said direction of movement, and each being provided with an upstanding lug adjacent to its respective rearward edge, each cushion affording an external load engaging surface; said inner wall of the belt being provided with a plurality of perforations disposed in a random pattern so as to insure that each of said cushions is in pneumatic communication with one or more of the apertures of each cylinder during said circuitous movement; a pair of laterally opposed side plates each having respective marginal edges disposed in close proximity to said inner wall and said cylinders thereby to form a closed chamber therebetween; a source of air under pressure including conduit means adapted to supply air to the individual cushion compartments of said chamber at a predetermined flow rate; an exhaust opening provided in one of said side plates; an exhaust valve cover pivotally connected to said side plate and adapted to be moved between an open position permitting exhausting of air through said opening and a closed position in substantially sealing relationship; and a biasing spring carried by said side plate and contacting said valve cover to urge the same toward said closed position thereby to maintain a predetermined air pressure within the pneumatic chambers of said cushions.

9. An endless belt and support therefor comprising a pair of elongated cylinders affording respective axes of rotation, a support bracket having two pairs of laterally opposed arms individually rotatably supporting said cylinders with said axes in spaced, substantially parallel alignment; said cylinders having respective peripheral walls provided with a plurality of apertures therein disposed in a random pattern; an annular covering of elastomeric material circumscribing each of said cylinders and provided with a plurality of apertures in matching relation to the apertures of the respective cylinder; an endless belt trained about said cylinders for circuitous movement therearound, the belt having spaced opposed inner and outer walls defining a pneumatic chamber therebetween, the outer wall being integrally joined to said inner wall at substantially uniform circumferential intervals so as to provide an external configuration of substantially uniform, circumferentially spaced cushions, said outer wall being fabricated of a flexible material of limited resiliency; drive means operatively connected to one of said cylinders to rotate the same and propel the belt in said circuitous movement in a predetermined direction; each of said cushions having a respective forward and rearward edge relative to said direction of movement, and each being provided with an upstanding lug adjacent to its respective rearward edge, each cushion affording an external load engaging surface; said inner wall of the belt being provided with a plurality of perforations disposed in a random pattern so as to insure that each of said cushions is in pneumatic communication with one or more of the apertures of each cylinder during said circuitous movement; a pair of laterally opposed side plates each having respective marginal edges disposed in close proximity to said inner wall and said cylinders thereby to form a closed chamber therebetween; a source of air under pressure including conduit means adapted to supply air to the individual cushion compartments of said chamber at a predetermined flow rate; an exhaust opening provided in one of said side plates; an exhaust valve cover pivotally connected to said side plate and adapted to be moved between an open position permitting exhausting of air through said opening and a closed position in substantially sealing relationship; a biasing spring carried by said side plate and contacting said valve cover to urge the same toward said closed position and control the air pressure within the pneumatic chambers of said belt; and adjustable means to permit selective spacing of said elements and thereby control the tension on said belt.

10. The endless belt and support of claim 9 wherein each of said cushions is provided with laterally opposed marginal gussets extending between its respective load engaging surface and said upstanding lug thereby to form articulated side rails.

11. A load supporting device comprising a pair of spaced elements having respective axes of rotation, means mounting said elements for rotation about their respective axes with their axes in substantially parallel transverse alignment, an endless belt trained about said elements for circuitous travel thereabout and providing spaced upper and lower runs, a pair of spaced side plates extended between the upper and lower runs of the belt and between said rotatable elements and therewith defining a chamber, one of said plates having an exhaust valve opening therein, and means for supplying a continuous flow of air into the chamber at a rate sufficient to maintain a positive pressure in the chamber while substantially continuously exhausting air through the opening whereby excessive pressures developed within the chamber incident to external forces imposed on the belt are immediately dissipated by increased release of air through the exhaust opening.

12. A load supporting device comprising a pair of spaced elements having respective axes of rotation, means mounting said elements for rotation about their respective axes with their axes in substantially parallel transverse alignment, an endless belt trained about said elements for circuitous travel thereabout and providing spaced upper and lower runs, a pair of spaced side plates extended between the upper and lower runs of the belt and between said rotatable elements and therewith defining a chamber, one of said plates having an exhaust opening therein, means for supplying a continuous flow of air into the chamber at a rate sufficient to maintain a positive pressure in the chamber while substantially continuously exhausting air through the opening, and a closure member pivotally mounted on the plate above the exhaust opening for movement between a pendant position over the opening restricting release of air therethrough and an outwardly pivoted position for increased release of air through the opening.

13. A load supporting device comprising a pair of spaced elements having respective axes of rotation; means mounting said elements for rotation about their respective axes with their axes in substantially parallel transverse alignment; an endless belt trained about said elements for circuitous travel thereabout and providing spaced upper and lower runs; a pair of spaced side plates extended between the upper and lower runs of the belt and between said rotatable elements and therewith defining a chamber, one of said plates having an exhaust valve opening therein; means for supplying a continuous flow of air into the chamber at a rate sufficient to maintain a positive pressure in the chamber while substantially continuously exhausting air through the opening; and a plurality of lugs of resiliently flexible material borne by the belt and outwardly extended therefrom, each of said lugs having an internal chamber, a wall, and a port, said wall being outwardly extended from the belt and presenting a load engaging surface disposed in the direction of belt travel, said port being in substantially continuous communication with the chamber between the upper and lower runs of the belt whereby excessive pressures developed within the chambers of the lugs and within the chamber between the upper and lower runs of the belt by external forces exerted against the belt or lugs is immediately dissipated by increase of the flow of air exhausted through the opening in the side plate while the air supply means maintains a positive pressure in said chambers.

14. A load supporting device comprising a pair of spaced elements having respective axes of rotation; means mounting said elements for rotation about their respective axes with their axes in substantially parallel transverse alignment; an endless belt trained about said elements for circuitous travel thereabout and providing spaced upper and lower runs; a pair of spaced side plates extended between the upper and lower runs of the belt and between said rotatable elements and therewith defining a chamber, one of said plates having an exhaust valve opening therein; means for supplying a continuous flow of air into the chamber at a rate sufficient to maintain a positive pressure in the chamber while substantially continuously exhausting air through the opening; a closure member pivotally mounted on the plate above the exhaust opening for movement between a pendant position over the opening restricting release of air therethrough and an outwardly pivoted position for increased release of air through the opening; and a plurality of lugs of resiliently flexible material borne by the belt and outwardly extended therefrom, each having an internal chamber, a wall, and a port, said wall being outwardly extended from the belt and presenting a load engaging surface disposed in the direction of belt travel, said port being in substantially continuous communication with the chamber between the upper and lower runs of the belt whereby excessive pressures developed within the chambers of the lugs and within the chamber between the upper and lower runs of the belt by external forces exerted against the belt or lugs is immediately dissipated by increase of the flow of air exhausted through the opening in the side plate while the air supply means maintains a positive pressure in said chambers.

15. The endless belt and support of claim 1 wherein said chamber is divided into an inner portion disposed between the upper and lower runs and between the plates, and a plurality of substantially uniformly circumferentially spaced cushions formed by said inner and outer walls and each having an internal compartment with a port in continuous communication with the inner portion of the chamber for maintenance of a positive pressure in the compartments and dissipation of excessive pressures in the compartments incident to external forces received against said cushions by increased exhaust through the ports to the compartments and exhaust through said opening of the chamber.

References Cited by the Examiner
UNITED STATES PATENTS

| | | | |
|---|---|---|---|
| 2,416,183 | 2/1947 | Kraft | 305—34 |
| 2,900,210 | 8/1959 | Parsons | 305 34 X |
| 3,074,764 | 1/1963 | Bertelsen | 305—34 X |
| 3,095,938 | 7/1963 | Bertelsen | 180—7 |
| 3,168,069 | 2/1965 | Everest | 180—7 X |
| 3,170,533 | 2/1965 | Fewel | 180—9.2 |

BENJAMIN HERSH, *Primary Examiner.*

ARTHUR L. LA POINT, A. HARRY LEVY, *Examiners*

R. J. JOHNSON, *Assistant Examiner.*